Jan. 5, 1971 YOLANDE MARIE ANTOINETTE DE PERTHUIS DE LAILLEVAULT 3,552,057
FIGURE TOY
Filed May 29, 1968 3 Sheets-Sheet 1

INVENTOR
YOLANDE MARIE-ANTOINETTE DE PERTHUIS DE LAILLEVAULT

BY Young & Thompson
ATTORNEYS

Jan. 5, 1971  YOLANDE MARIE ANTOINETTE  3,552,057
DE PERTHUIS DE LAILLEVAULT
FIGURE TOY

Filed May 29, 1968  3 Sheets-Sheet 3

INVENTOR
YOLANDE MARIE-ANTOINETTE DE PERTHUIS DE LAILLEVAULT

BY  *Young + Thompson*
ATTORNEYS

United States Patent Office 3,552,057
Patented Jan. 5, 1971

3,552,057
FIGURE TOY
Yolande Marie Antoinette de Perthuis de Laillevault,
35 Rue de la Faisanderie, Paris 16, France
Filed May 29, 1968, Ser. No. 733,023
Int. Cl. A63h 3/00
U.S. Cl. 46—151                                                           4 Claims

ABSTRACT OF THE DISCLOSURE

A figure toy has a skeleton or armature of pliable filamentary material such as flexible cord or bendable wire. On the armature is a plurality of laminae, which may be separate discs but which preferably are formed by a helix of flexible material such as cloth or plastic strip. The laminae are preferably pleated so as to be gathered about the armature.

---

The present invention relates to figure toys, more particularly of the type in which the limbs of the toy may be manipulated so as to permit the toy to assume different attitudes.

It is an object of the present invention to provide a figure toy whose limbs are readily manipulatable.

Another object of the present invention is the provision of a figure toy which can be made in any desired form so as to simulate any of a very large number of figures.

Still another object of the present invention is the provision of a figure toy that has the appearance of occupying a large volume but which is light in weight.

The invention also comprises a figure toy which can be made from any of a variety of materials, for amusement purposes or for the advertisement or sale of materials or services.

Finally, it is an object of the present invention to provide a figure toy that will be relatively simple and inexpensive to manufacture, easy to clean, and rugged and durable in use.

Other objects and advantages of the present invention will become apparent from a consideration of the following description, taken in connection with the accompanying drawings, in which.

Figure 1:
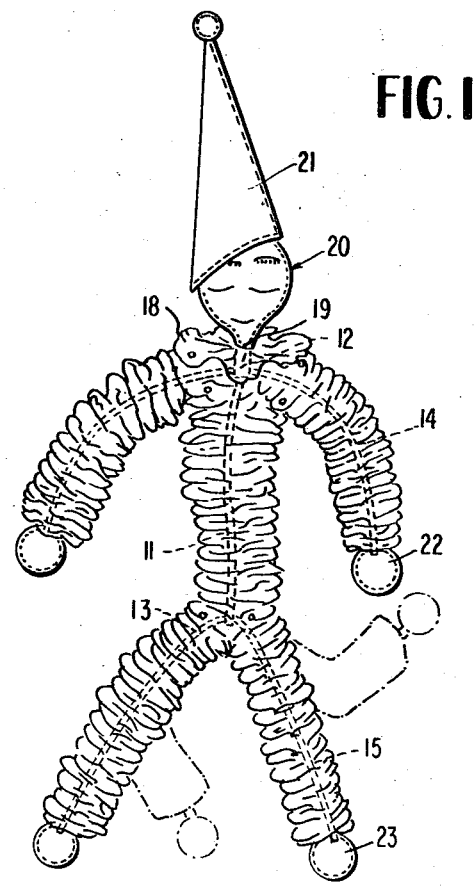
FIG. 1 is a view of one form of figure toy according to the present invention.

Referring now to the drawings in greater detail, and first to the embodiment of FIGS. 1-5, there is shown a figure toy in the form of a clown the attitude of whose body is defined by a deformable skeletal armature. The armature can be of a flexible material such as cords or strips of woven material or plastic or rubber or a slender spring; or the armature can be of a bendable material such as mild steel, wire or strip. In the former case, the figure toy will assume various attitudes under the influence of gravity. In the latter case, the limbs of the figure toy can be bent to various positions, after which the figure toy will tend to remain in these positions.

In any event, the armature is comprised by a trunk portion 11 having an upper end 12 and a lower end 13. Upper end 12 is secured to an arm portion 14 of the armature by means of a joint best seeen in FIG. 3. Lower end 13 is attached to a leg portion 15 of the armature by a joint best seen in FIG. 4. Of course, these joints can be formed by cementing or stitching or tying in the case of nonmetallic materials; and in the case of metallic materials, they can be formed by cementing or welding or riveting or other suitable joining operations.

Figure 2:
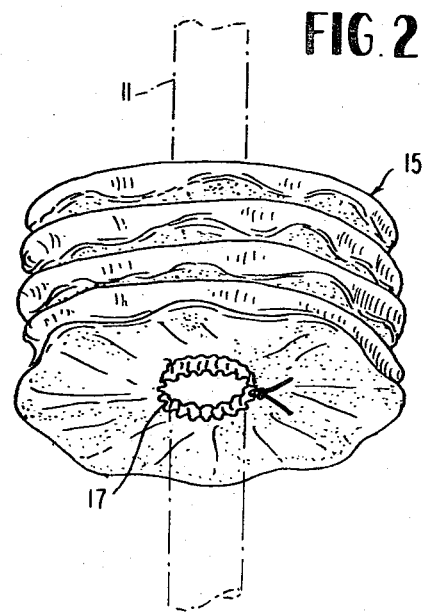
FIG. 2 is an enlarged fragmentary perspective view showing one embodiment of lamina for use in the invention.
Figure 3:
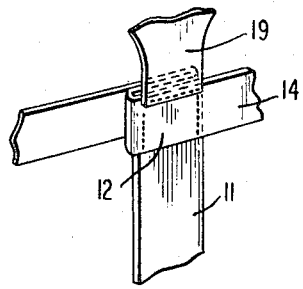
FIG. 3 is an enlarged fragmentary perspective view of the armature of the figure toy of FIG. 1 in the vicinity of the neck.

A plurality of laminae are strung on the armature in abutting relationship. One form of these laminae is seen in detail in FIG. 2, in which each lamina is formed from a circular disc of flexible material such as silk cloth or plastic or the like, pierced in its center for the reception of the armature portion. Each lamina of FIG. 2 is of at least a double thickness of material, for the outer portions of the disc of material are folded back to the center and gathered to form a collar 17 whose pleats can be retained about the armature by means of a thread stitched about the periphery of the disc of material and gathered as seen in FIG. 2. Thus, one side of each lamina of FIG. 2 will tend to be relatively flat while the other side will tend to be pleated; and the laminae when strung on the armature will tend to have enough bulk to give the appearance of a bulky figure but without the weight that would ordinarily be associated with this bulk.

A ruffled collar 18 surrounds the neck 19 of the figure, which is joined to the armature at end 12 of portion 11. The neck 19 supports the figure's head 20 which may be two pieces of fabric or felt secured together back-to-back in such a way as to form a bag filled with a soft stuffing and topped by the hat 21.

Figures 4, 5:
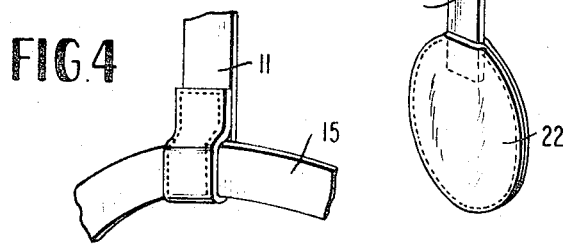
FIG. 4 is an enlarged fragmentary perspective view of the armature of the figure toy of FIG. 1 in the vicinity of the hips.
FIG. 5 is an enlarged fragmentary perspective view of a hand of the figure toy of FIG. 1.

Hands 22 and feet 23 can be formed at the ends of the respective armature portions 14 and 15, in the manner shown in FIG. 5, namely, by securing together two thicknesses of material on the armature ends as by stitching or cementing or the like. These hands and feet also serve to keep the laminae assembled on the armature portions.

Figure 6:
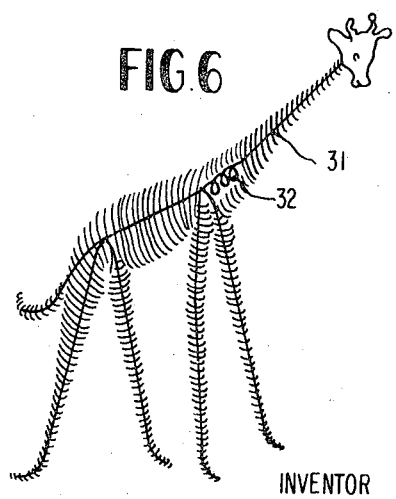
FIG. 6 is a view of a different form of figure embodying the present invention.
Figure 7:
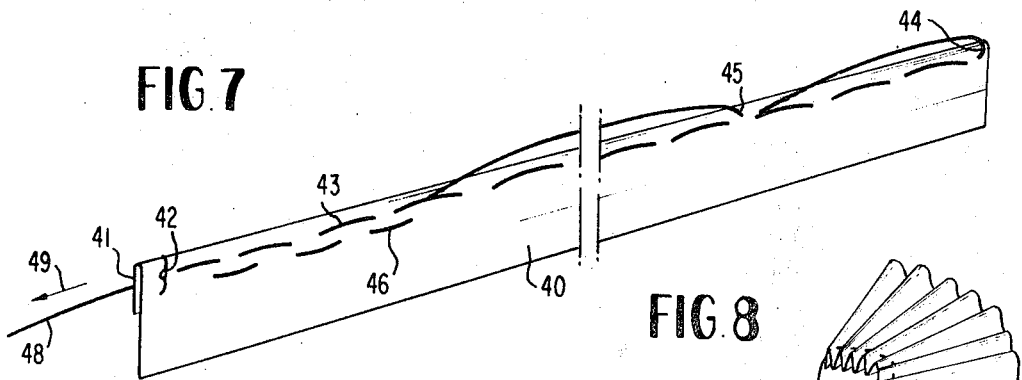
FIGS. 7, 8 and 9 show successive steps in the formation of a different embodiment of lamina of the present invention.

Another form of figure toy according to the present invention is shown in FIG. 6, in the form of a giraffe. For such a figure, designed to stand on its own legs, it is preferable that the armature be of the bendable type, for example, of soft iron wire for the legs and trunk and tail; while the armature portion 31 of the neck is preferably a relatively stiff member such as steel, thereby to imitate the rigidity characteristic of a giraffe's neck. The armature portion 31 can be connected to the body of the armature by means of a spring 32, which permits the giraffe's neck to bob. A suitable material for the laminae strung on the armature, in this case, would be for example slices of natural or artifiicial sponge which could for example be scrap sponge.

Another embodiment of lamina and its mode of formation are shown in FIGS. 7–10. As will there be seen, an elongated strip 40 of cloth or paper or rubber or plastic or other flexible strip material has one edge folded back on itself to provide a hem 41. From its fixed end 42, a thread 43 is stitched through the double material of the hem to the opposite end 44 of the strip. This stitching may be done in known manner on a sewing machine, for example using a machine having a pleater foot.

Figure 8:
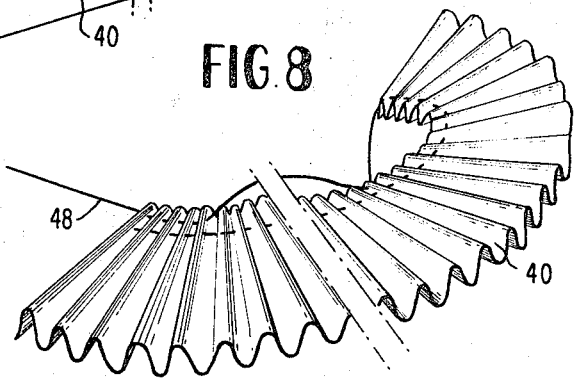
Figure 10:
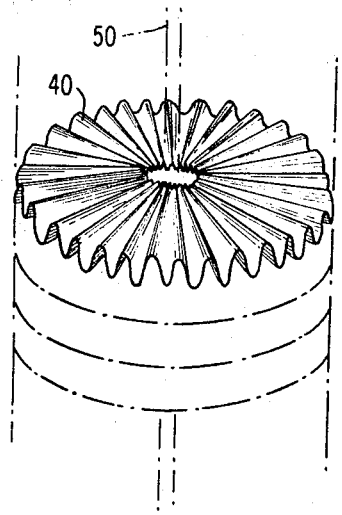
FIG. 10 is a perspective view showing the relationship to the armature of the lamina of FIGS. 7-9.
Figure 9:
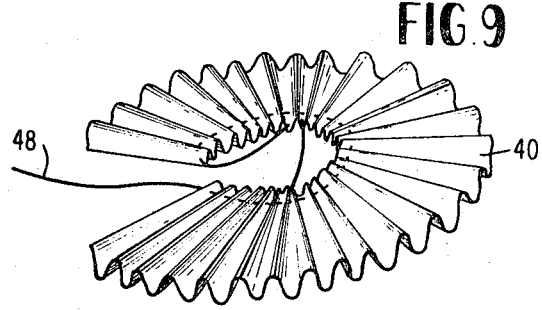

The thread 43 then returns and is stitched to the hem at spaced points such as 45, 46. Then, with the secured end 42 held motionless, traction is exerted on the free end 48 of the thread in the direction of the arrow 49 until the strip is completely pleated and assumes the shape of a fan, as seen in FIG. 8. The tension on the thread end 48 can be continued until the pleated strip closes to the form of a collar as seen in FIG. 9, after which it can be strung on an armature portion 50 as shown in FIG. 10, the end portions of the strip being held together in any suitable manner.

Figure 11:
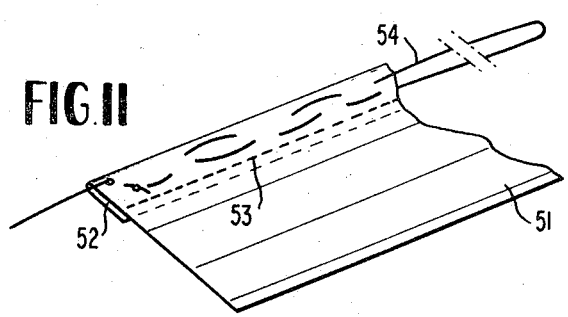
FIG. 11 is a view similar to FIG. 7 but showing another embodiment of pleat-forming structure according to the invention.

FIG. 11 shows another embodiment of the invention, in which a strip 51 is already hemmed at 52 by a line of stitching 53. The pleating thread 54 is then applied to the preformed hem as in FIG. 7, the difference between FIGS. 7 and 11 residing in the fact that in FIG. 7, the thread 43 forms the hem as well as the pleat.

Figure 13:
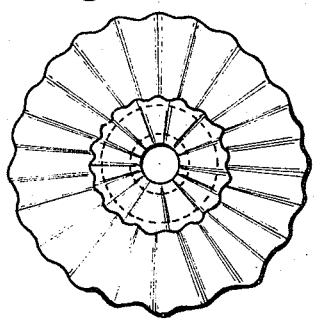
FIG. 13 shows a completed lamina embodying the form of FIG. 12.
Figure 12:
FIG. 12 is a view similar to FIG. 11 but showing another modification of the structure.

In the embodiment shown in FIG. 12, the strip 55 is of single thickness and is not hemmed. The pleating member is constituted by an elastic ribbon 56 applied along the edge 57 of the strip 55 by means of lines of stitching 58 and 59 which can be formed for example with a two-needle machine. The ribbon 56 is maintained under tension during application to the strip 55, so that when this tension is released, the strip 55 will be pleated by contraction of the ribbon 56. A completed lamina formed by this method is shown in FIG. 13.

Figure 14:
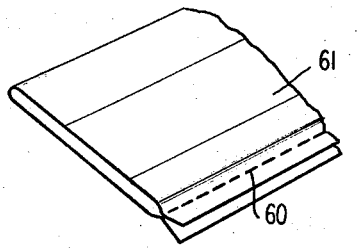
FIG. 14 is a view similar to FIGS. 11 and 12 but showing still another variation.

FIG. 14 shows another embodiment, in which a line of stitching 60 is effected with a stretched elastic thread. This thread also secures together the two thicknesses of a strip 61 that is folded on itself, so that when the tension in the thread is released, the strip will become pleated.

Figure 15:
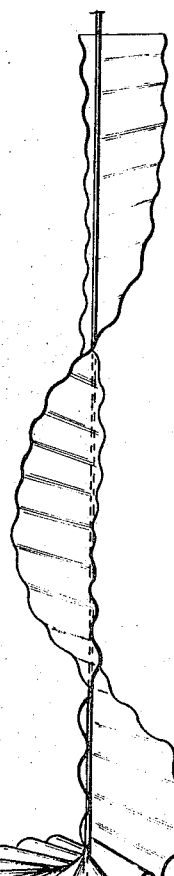
FIG. 15 is a fragmentary perspective view showing the formation of a structure of helical form.

Not only the embodiments of FIGS. 12 and 14, but also the other embodiments of forming pleats in strip material can be applied to a continuous or spiral formation of the pleated material. Thus, as will be evident from FIG. 15, the laminae need not be separate platelike members, but can instead be the turns of a continuous helix. The helix is supported by a central filament 63 which is a portion of an armature of a toy figure according to the present invention. Thus, by using the continuous helical form of the present invention, pleated material can be manufactured in great lengths and cut off to the desired length such that when wound about the armature part, the length which has been cut off will cover all of that armature part, or will comprise all of the body of the figure of a given diameter.

Figure 16:
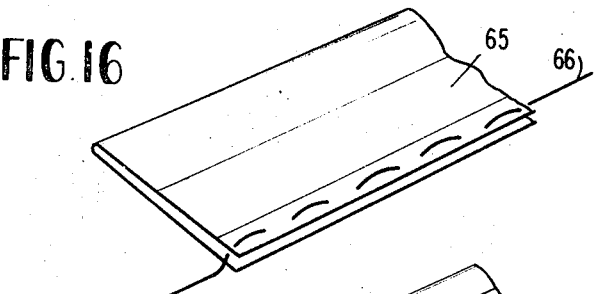
FIGS. 16 and 17 are views similar to FIG. 14 but showing still other forms.

Still other forms of pleat-forming structure can be provided according to the present invention. In FIG. 16 is shown a strip 65 folded on itself and stitched by means of an ordinary pleating thread 66 which when drawn tight will cause the material to pleat as in the foregoing embodiments.

Figure 17:
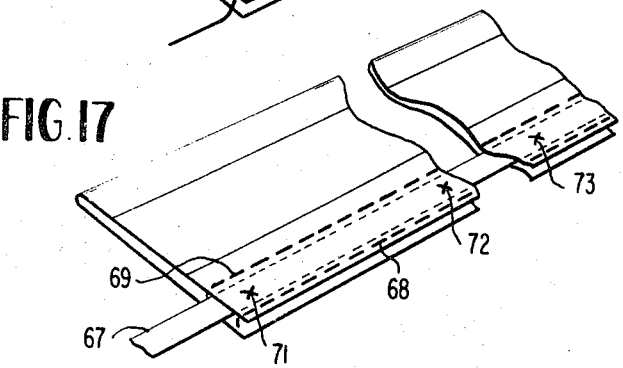

FIG. 17 shows another embodiment, in which an elastic ribbon 67 is incorporated between two lines of stitching 68, 69 and is tacked in stretched position at a plurality of points 71, 72 and 73 suitably spaced according to techniques already old in the art of curtain making.

Figure 18:
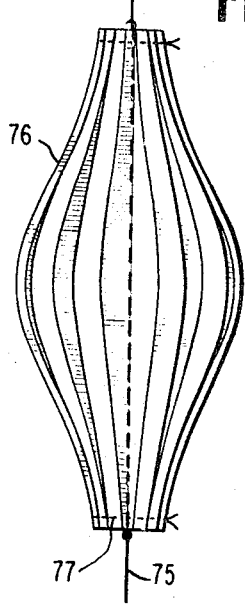
FIG. 18 is an elevational view of a tubular pleated structure according to the invention.
Figure 19:
FIG. 19 is a schematic end view of a portion of the structure of FIG. 18.
Figure 20:
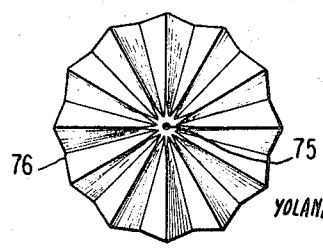
FIG. 20 is an end view of the over-all structure of FIG. 18.
Figure 20:
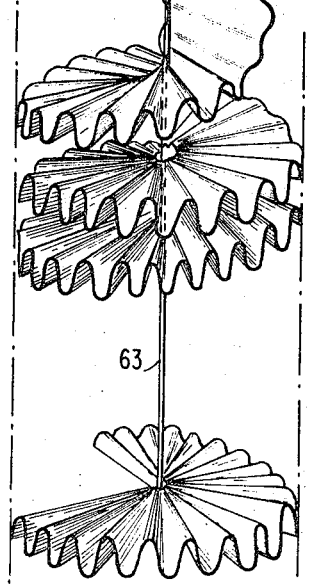

In FIGS. 18–20 is shown still another embodiment of the invention which differs from the preceding embodiments in that it does not involve a pluarlity of laminae. It resembles the embodiments of FIGS. 7–17, however, in that the material is pleated about the central armature. In the embodiment of FIGS. 18–20, the armature portion 75 is surrounded by a generally tubular structure 76 which is gathered and pleated at each end by means of a pleating thread 77 that passes through all the folds of the material along each of the opposite end edges of the material. The structure 76 can have a greater or lesser diameter according to the spacing of its ends; and of course a plurality of these structures can be arranged on the armature in abutting relationship or in other arrangements.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

Having described my invention, I claim:

1. A figure toy comprising a deformable filamentary armature, a flexible filament with a strip of flexible material pleated on the flexible filament, the flexible filament being wound spirally about said armature, the filament being secured only to an edge portion of the strip, and said edge portion of the strip being positioned against the armature with the strip extending outwardly from the filament in all directions away from the armature.

2. A figure toy as claimed in claim 1, said flexible filament penetrating alternately opposite sides of said flexible strip in stitched relationship.

3. A figure toy as claimed in claim 1, said flexible strip being cloth.

4. A figure toy as claimed in claim 1, said armature being flexibly deformable under the weight of the figure toy thereby to assume various attitudes under the influence of gravity.

References Cited

UNITED STATES PATENTS

| | | | |
|---|---|---|---|
| 2,112,723 | 3/1938 | Wisoff | 161—132X |
| 2,257,154 | 9/1941 | Bleyer | 161—9 |
| 2,468,997 | 5/1949 | Osgood | 161—17X |
| 2,812,616 | 11/1957 | Ford | 46—151 |

ROBERT PESHOCK, Primary Examiner

U.S. Cl. X.R.

46—156